United States Patent
Brock (10) Patent No.: US 9,351,270 B2
(45) Date of Patent: May 24, 2016

(54) METHOD, APPARATUSES AND COMPUTER PROGRAM PRODUCT FOR ASSIGNING A UNIQUE LOCATION AREA CODE IN A NETWORK COMPRISING SMALL CELLS SERVED BY HOME NODE B'S UNDERLYING A MACROCELL

(71) Applicant: IP. Access Limited, Cambridge (GB)

(72) Inventor: David Brock, Cambridge (GB)

(73) Assignee: IP.Access Limited, Cambridge (GB)

( * ) Notice: Subject to any disclaimer, the term of this patent is extended or adjusted under 35 U.S.C. 154(b) by 0 days.

(21) Appl. No.: 14/437,924

(22) PCT Filed: Oct. 4, 2013

(86) PCT No.: PCT/EP2013/070746
§ 371 (c)(1),
(2) Date: Apr. 23, 2015

(87) PCT Pub. No.: WO2014/063914
PCT Pub. Date: May 1, 2014

(65) Prior Publication Data
US 2015/0289223 A1    Oct. 8, 2015

(30) Foreign Application Priority Data
Oct. 25, 2012    (GB) .................................. 1219180.5

(51) Int. Cl.
| | | |
|---|---|---|
| *H04W 60/04* | (2009.01) | |
| *H04W 16/32* | (2009.01) | |
| *H04W 64/00* | (2009.01) | |
| *H04W 84/04* | (2009.01) | |
| *H04W 88/12* | (2009.01) | |

(52) U.S. Cl.
CPC .............. *H04W 60/04* (2013.01); *H04W 16/32* (2013.01); *H04W 64/003* (2013.01); *H04W 84/042* (2013.01); *H04W 84/045* (2013.01); *H04W 88/12* (2013.01)

(58) Field of Classification Search
CPC ........ H04W 8/12; H04W 12/06; H04W 48/16
USPC ............................ 455/432.1, 433, 435.1, 458
See application file for complete search history.

(56) References Cited

U.S. PATENT DOCUMENTS
2008/0207170 A1    8/2008    Khetawat

FOREIGN PATENT DOCUMENTS
| | | |
|---|---|---|
| WO | 20120042361 A1 | 4/2012 |
| WO | 20130016585 A1 | 1/2013 |

OTHER PUBLICATIONS

Huawei: "Iu-based 3G HNB Architecture", 3GPP Draft; R3-081166 IU-Based 3G HNB Architecture, 3rd Generation Partnership Project (3GPP), Mobile Competence Center; 650, Route Des Lucioles; F-06921 Sophia-Antipolis Cedex; France, vol. RAN WG3, No. Kansas City, USA; Apr. 30, 2008, XP050164359, [retrieved on Apr. 30, 2008] paragraph [04.2]; figure 1.

(Continued)

*Primary Examiner* — Sam Bhattacharya
(74) *Attorney, Agent, or Firm* — Optimus Patents US, LLC (57) ABSTRACT

In a network comprising a cluster of small cells 100-111 underlying a macrocell 112, each small cell served by its own Home Node B 100, 101 is assigned a unique "on the air" Location Area Code so that as a User Equipment 113 moves from the coverage area of one Home Node B to another it will initiate a Location Update. Each time a Location Update is initiated, this triggers a location presence notification message to a presence server 206. The Core Network 203 is unaware of the "on the air" Location Area Codes and so does not need to be informed of User Equipment movement between Home Node B's. The Home Node B network is arranged to handle the registration procedure locally, as from the Core Network perspective, the Location Area Code has not changed. Instead, the Core Network sees a Iu LAC that is shared amongst the several Home Node B's operating through a single Home Node B Gateway. Hence the arrangement offers fine granularity of location presence detection with no additional Core Network load.

13 Claims, 3 Drawing Sheets

(56) References Cited

OTHER PUBLICATIONS

"3rd Generation Partnership Project; Technical Specification Group Radio Access Network; UTRAN architecture for 3G Home Node B (HNB); Stage 2 (Release 11)", 3GPP Standard, 3GPP TES 25.467, 3rd Generation Partnership Project (3GPP), Mobile Competence Centre; 650, Route Des Lucioles; F-06921 Sophia-Antipolis Cedex; France, vol. RAN WG3, No. V11.0.0, Sep. 21, 2012, pp. 1-62, XP050649582, [retrieved on Sep. 21, 2012] paragraphs [0004]-[04.2]; figures 4.1-1 paragraphs [6.1.2]-[6.1.2.3]table.

METHOD, APPARATUSES AND COMPUTER PROGRAM PRODUCT FOR ASSIGNING A UNIQUE LOCATION AREA CODE IN A NETWORK COMPRISING SMALL CELLS SERVED BY HOME NODE B'S UNDERLYING A MACROCELL

FIELD OF THE INVENTION

The field of this invention relates to network elements, a wireless communication system and methods for operating a cellular communication system and has particular applicability to providing a location presence service in such a system.

BACKGROUND

Wireless communication systems, such as the 3rd Generation (3G) of mobile telephone standards and technology, are well known. An example of such 3G standards and technology is the Universal Mobile Telecommunications System (UMTS™), developed by the 3rd Generation Partnership Project (3GPP™) (www.3gpp.org). The 3rd generation of wireless communications has generally been developed to support macro-cell mobile phone communications. Such macro cells utilise high power base stations (NodeBs in 3GPP parlance) to communicate with wireless communication units within a relatively large geographical coverage area. Typically, wireless communication units, or User Equipment (UEs) as they are often referred to in 3G parlance, communicate with a Core Network (CN) of the 3G wireless communication system via a Radio Network Subsystem (RNS). A wireless communication system typically comprises a plurality of radio network subsystems, each radio network subsystem comprising one or more cells to which UEs may attach, and thereby connect to the network. Each macro-cellular RNS further comprises a controller, in a form of a Radio Network Controller (RNC), operably coupled to the one or more Node Bs, via a so-called Iub interface.

The second generation wireless communication system (2G), also known as GSM, is a well-established cellular, wireless communications technology whereby "base transceiver stations" (equivalent to the Node B's of the 3G system) and "mobile stations" (user equipment) can transmit and receive voice and packet data. Several base transceiver stations are controlled by a Base Station Controller (BSC), equivalent to the RNC of 3G systems.

Communications systems and networks are developing towards a broadband and mobile system. The 3rd Generation Partnership Project has proposed a Long Term Evolution (LTE) solution, namely, an Evolved Universal Mobile Telecommunication System Territorial Radio Access Network, (E-UTRAN), for a mobile access network, and a System Architecture Evolution (SAE) solution, namely, an Evolved Packet Core (EPC), for a mobile core network. An evolved packet system (EPS) network provides only packet switching (PS) domain data access so voice services are provided by a 2G or 3G Radio Access Network (RAN) and circuit switched (CS) domain network. User Equipment (UE) can access a CS domain core network through a 2G/3GRAN such as the (Enhanced Data Rate for GSM Evolution, EDGE) Radio Access Network (GERAN) or a Universal Mobile Telecommunication System Terrestrial Radio Access Network (UTRAN), and access the EPC through the E-UTRAN. Some User Equipments have the capability to communicate with networks of differing radio access technologies. For example, a User Equipment may be capable of operating within a UTRAN and within an E-UTRAN.

Lower power (and therefore smaller coverage area) cells are a recent development within the field of wireless cellular communication systems. Such small cells are effectively communication coverage areas supported by low power base stations. The terms "picocell" and "femtocell" are often used to mean a cell with a small coverage area, with the term femtocell being more commonly used with reference to residential small cells. Small cells are often deployed with minimum RF (radio frequency) planning and those operating in consumers' homes are often installed in an ad hoc fashion. The low power base stations which support small cells are referred to as Access Points (AP's) with the term Home Node B (HNB) or Evolved Home Node B (eHNB) defined by 3GPP to identify femtocell Access Points. Each small-cell is supported by a single Access Point. These small cells are intended to augment the wide area macro network and support communications to multiple User Equipment devices in a restricted, for example, indoor environment. Such small cells are intended to be able to be deployed "underneath" a macrocell (in a multi-layer structure, for example) in order to support communications to UEs in a restricted area such as a shopping mall, for example. An additional benefit of small cells is that they can offload traffic from the macro network, thereby freeing up valuable macro network resources). One or more Access Points are linked to a Core Network through an Access Controller. An Access Controller which links one or more HNB's to the Core Network is known as a Home Node B Gateway (HNB-GW). An HNB provides a radio access network connectivity to a user equipment (UE) using the so-called Iuh interface to a HNB-GW.

Typical applications for such Access Points include, by way of example, residential and commercial locations, communication 'hotspots', etc., whereby Access Points can be connected to a core network via, for example, the Internet using a broadband connection or the like. In this manner, small cells can be provided in a simple, scalable deployment in specific in-building locations where, for example, network congestion or poor coverage at the macro-cell level may be problematic.

Thus, an AP is a scalable, multi-channel, two-way communication device that may be provided within, say, residential and commercial (e.g. office) locations, 'hotspots' etc, to extend or improve upon network coverage within those locations. Although there are no standard criteria for the functional components of an AP, an example of a typical AP for use within a 3GPP 3G system may comprise Node-B functionality and some aspects of Radio Network Controller (RNC) functionality as specified in 3GPP TS 25.467.

Herein, the term "small cell" means any cell having a small coverage area and includes "picocells" and "femtocells."

Often in a small cell network, an Access Point Management System (AMS) is provided which communicates with the Access Point and/or the Access Controller. This management system is typically configured to manage a large number of Access Points, for example, monitoring, software upgrades, failure management and informing each Access Point of its assigned Location Area Code (or Routing Area Code). A Location Area Code (LAC) is a specific field in a Local Area Identifier which uniquely distinguishes one LA from others which are serviced by the same Mobile Switching Centre (MSC) of the Core Network. Some small cell systems employ a two-tiered LAC allocation scheme in order to maximise the number of supported small cells with distinct LAC's yet make the entire small cell system transparent to the core network. (See for example US-A-20080207170).

When a User Equipment (UE) camps on to a particular HNB, for example, the HNB attempts to register the UE with the HNB-GW by sending a HNBAP UE register request message. The message can contain a UE identity and will be acknowledged with an accepted message if the registration is successful. The HNB broadcasts its assigned LAC which the UE detects and acknowledges that it is now operating in in that Location Area by sending a "Location Update" message. The location update messaging includes information on the UE's previous location area (eg. LAC). The HNB may subsequently monitor the UE via the periodic location updates. If a number of location updates are missed, the HNB assumes that the UE is no longer camped on and has left the HNB's area of coverage. The HNB then informs the HNB-GW of this occurrence by sending a HNBAP deregister message.

A current industry model is to implement a GSMA OneAPI on one of three places: viz. on the User Equipment (for handset applications) or on the small cell (for local applications) or on the application Gateway (for external third-party access). The GSMA OneAPI is an application programming interface which has been developed by the GSM (Global System for Mobile Communications) Association. It is intended to be a web service interface. An application developed with OneAPI can obtain information across network operators that support it. It is intended for operation on servers and mobile devices and the first API's to be implemented will be for messaging and location functions. Specifically, version 1 requires "location presence" capability and the ability to send and receive short message services (SMS) and multimedia messaging services (MMS) through the application Gateway using the GSMA OneAPI.

"Presence" services in general permit an individual and equipment which he/she uses for communication to share information on the state of the individual and that equipment. Such information can include whether the individual and his/her communication equipment are currently able to communicate with others or are engaged on a video call, for example. "Presence" can also include information relating to the location of a user's communication equipment. A "presence server" may be provided in such instances for, on detection that a particular UE has entered a particular location, enabling applications that subscribe to a "presence" service to take some form of action. For example, location information can be very useful to retailers and advertisers who may wish to communicate with shoppers who are known to be in a certain location at a certain time, a shopping mall for example.

Some current Location Presence services are based on the use of a localised Identity Request sent by an Access Point to a UE to obtain its IMSI (International Mobile Subscriber Identifier). This was originally proposed to support a form of access control. If the Access Point is prepared to offer normal telecoms service then the UE is allowed to register on the small cell. Alternatively, the IMSI may be captured from the so-called "Common ID" sent by the Core network. In each case an Access Point must have a different Location Area Code (or Routing Area Code) from the surrounding coverage (ie. other small cells or overlapping macrocell) in order to prompt a Registration attempt when camping on. A registration attempt may be used to prompt a location presence trigger. (See Applicant's co-pending Application GB 1209224.3).

In summary, current Location Presence services provide detection of a permitted user camping on an Access Point (or HNB). At this point a Registration will also be sent to the Core Network. The Registration signalling load can be significant, particularly if "fine-grained" location presence based on very small cells is required. Hence, a method for supporting a fine grained location presence service without significantly increasing signalling load would be desirable.

SUMMARY OF THE INVENTION

Aspects of the invention provide an apparatus, a wireless communication system and methods therefor as described in the appended claims.

According to a first aspect of invention there is provided a method for operating a cellular communication system comprising a plurality of neighbouring small cells, each of said plurality of neighbouring small cells supporting communications between a wireless communication unit and a core network through an access controller, the method comprising; assigning a unique area code from a group of unique area codes to each neighbouring small cell, storing a unique area code associated with the access controller, receiving at a first of said neighbouring small cells, a registration request from a wireless communication unit, said request including an identity of the wireless communication unit and an area code of a last visited cell, comparing the area code of the last visited cell with the area code of the first cell, and if they are different and belong to said group of unique area codes, generating an acceptance message including the unique area code of the first cell and forwarding said acceptance message to the wireless communication unit without forwarding the registration request to the core network, otherwise, replacing the unique area code of the first cell with the area code associated with the access controller in the registration request and forwarding the request to the core network, and replacing the unique area code associated with the access controller with the unique area code of the first cell in a registration acceptance message received from the core network and forwarding the registration acceptance message to the wireless communication unit.

The method may further include; on receipt of the registration request, notifying a location presence server of the presence of the wireless communication unit in said first cell and of the identity of the wireless communication unit. In this way, a fine-grained location presence service with no additional core network signalling load may be provided.

In one embodiment, if the comparison between the unique area codes of the first cell and the last visited cell reveal that they are different, then the identity of the wireless communication unit and the unique area code of the first cell are stored in a network element as a linked pair of parameters.

The method may also include notifying a location presence server when the wireless communication unit has left the coverage area of the first cell. For example, on accepting the registration request, an instruction may be sent to the wireless communication unit to transmit periodic location update messages every "T" minutes. When no update has been received at the first cell for a period in excess of T minutes say, it is assumed that the wireless communication unit has left the first cell, at which time the location presence server can be notified. The location update messages may be forwarded to the core network less frequently than every T minutes, preferably at a rate expected by the core network.

Each unique area code may be a Location Area Code or a Routing Area Code.

The registration request may comprise a Location Update or a Periodic Location Update.

The identity of the wireless communication unit may comprise its IMSI. The invention may thus be employed to provide a way of collecting IMSIs for use in fine-grained Location Presence Services. As each small cell is provided with unique area code, rather than all of them sharing the area code of the access controller (the so-called Iu LAC for example), each time a User Equipment moves from one small cell's area of coverage to another, a location presence notification can be generated and used by any commercial enterprise that subscribes to such a presence service. This is because a request for registration will always be generated when a User Equipment sees a change in area code. This registration request is used to trigger a location presence notification.

According to a second aspect of the invention, there is provided an apparatus for a cellular communication system, the system comprising a plurality of neighbouring small cells, each of said plurality of neighbouring small cells supporting communications between a wireless communication unit and a core network through an access controller, the apparatus comprising one or more network elements for assigning a unique area code from a group of unique area codes to each neighbouring small cell, storing a unique area code associated with the access controller, receiving at a first of said neighbouring small cells, a registration request from a wireless communication unit, said request including an identity of the wireless communication unit and an area code of the last visited cell, comparing the area code of the last visited cell with the unique area code of the first cell, and if they are different and belong to said group of unique codes, generating an acceptance message including a unique area code of the first cell and forwarding said acceptance message to the wireless communication unit without forwarding the registration request to the core network, otherwise, replacing the unique area code of the first cell with the area code associated with the access controller in the registration request and forwarding the registration request to the core network and replacing the unique area code associated with the access controller with the unique area code of the first cell in a registration acceptance message received from the core network and forwarding the registration acceptance message to the wireless communication unit.

The apparatus may include one or more network elements for, on receipt of the registration request, generating a location presence message including data relating to the location of the first cell and the identity of the wireless communication unit and further including a location presence server for receiving said location presence message and for storing said data.

The apparatus may include one or more network elements for storing the identity of the wireless communication unit and the unique area code of the first cell as a linked pair of parameters if the area code of the last visited cell and the area code of the first cell are different.

The apparatus may include one or more network elements for sending an instruction to the wireless communication unit to transmit a location update message every T minutes, monitoring said location update messages in the first cell, and notifying the location presence server of the exit of the wireless communication unit from the first cell when a location update message has not been received in the first cell for a period exceeding T minutes The small cell network thus uses many Location Area Codes "on the air" (ie. between a UE and an Access Point, for example), but appears to use fewer (possibly 1) LAC's between the Access Point Controller and the Core Network. This can achieved by manipulation of the NAS (non access stratum) messages passing through the small cell network, such that the Core Network believes the UE is registered on one LAC, (denoted Iu LAC), but the Access Point is actually broadcasting a different "on-the-air" LAC (denoted OTA LAC) and a registration message response (or acceptance message) passed to the UE contains the OTA LAC. In a typical 3G system, the NAS messages between the UE and the Core Network are carried in a RANAP (Radio Access Network Application Part) message "wrapper." When a UE moves between Location Areas it sends a "Location Update" message with the "old" LAC (ie. the LAC of the last-visited cell) in the body of the NAS message and the Radio Access Network includes the "new" LAC in the RANAP parameters. The response from the Core Network has the new LAC in the body of the NAS message to acknowledge the change. Additionally, a periodic Location Update may be sent (from the UE) when a UE has remained on a LAC for a "long" time (typically 60 minutes). It is a confirmation that the UE is still where it was last registered. In this case the "old" and "new" LAC will be the same. In this case it is preferable for the message to be forwarded to the Core Network so that the latter knows the UE is still there. When the Core Network responds it may update some of the other parameters in the NAS message. A differing value in a "Location Updating Type" field in the NAS message distinguishes between a Location Update message prompted by a detected change in LAC and a periodic Location Update.

In one embodiment, a plurality of HNBs, each serving a plurality of neighbouring small cells in an area, are assigned different on-the-air LAC's so that as a UE moves from the coverage area of one HNB to another it will initiate a Location Update. However, the Core Network is unaware of this multiplicity of "on the air" LACs. Furthermore, since the Core Network is unaware of the OTA LACs it does not need to be informed of UE movement between OTA LACs. Thus the Location Updates between HNBs can be handled within the HNB system (by a HNB-GW for example), provided it stores the data contained in those messages received from the Core Network on first registration to an HNB (or HNB-GW) for re-use in later Registrations between HNBs. Each time a Location Update is received at a HNB from a UE, a location presence notification can be generated.

This arrangement of overlapping coverage areas and local handling of Location Updates therefore offers fine granularity of presence detection with no additional Core Network load.

Advantageously, HNBs may be placed at locations where a Location Presence service is desired. For fine-grained location presence (e.g. different areas of a shopping mall or large retail store), the HNB coverage may be conveniently arranged such that UEs will reselect from one HNB to another. The OTA LACs assigned to the HNBs are arranged so that adjacent HNBs have different LACs. The different OTA LACs used by adjacent HNBs cause UEs to register as they move between HNB coverage areas, thus offering the opportunity to generate Location Presence triggers. The HNB network is arranged to handle the registration procedure locally, as from the Core Network perspective the LAC has not changed. The Core Network just sees the Iu LAC that is shared amongst the several HNB's operating through a single HNB-GW. In another embodiment, if a UE remains within the coverage area of a particular HNB, it sends periodic Location Update messages to the HNB. The Core Network expects to receive these messages at a predetermined interval to confirm that the UE is still active within the Location Area associated with the Iu LAC. In this case, the HNB-GW may determine that the Location Update received is a periodic Location Update either from examination of the "Locating Updating Type" field in the message or by detecting that the new LAC and the old LAC contained in the message are the same. The HNB-GW may be configured to forward all or some of the periodic Location Updates to the Core Network. A sub-set of the periodic updates may be handled locally. An absence of periodic Location Updates after a predetermined interval may indicate to the HNB that the UE has left the HNB's coverage area, in which case, an HNB-GW or Access Point Management system may generate an "exit" notification message to a presence server, indicating the UE's departure from that particular location.

According to a third aspect of the invention, there is provided a wireless communication system comprising the apparatus of the second aspect.

According to a fourth aspect of the invention, there is provided a tangible computer program product having an executable computer program code stored thereon for execution by a processor to perform a method in accordance with the first aspect.

The tangible computer program product may comprise at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

These and other aspects, features and advantages of the invention will be apparent from, and elucidated with reference to, the embodiments described hereinafter.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to network elements, wireless communications system and methods therefor. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

The inventive concept finds particular applicability in a cellular communication system that supports a number of overlapping communication coverage areas, for example a communication system that comprises a combination of small cells and macro cells. Further, the inventive concept finds applicability in a cellular communication system comprising more than one Radio Access Technology.

Those skilled in the art will recognize and appreciate that the specifics of the examples described are merely illustrative of some embodiments and that the teachings set forth herein are applicable in a variety of alternative settings. For example, since the inventive concepts do not depend on any particular combination of radio access technologies, it is envisaged that the inventive concepts can be applied to other combinations of RAT's although 3G systems are shown in the embodiments. As such, other alternative implementations within cellular communication systems conforming to different standards are contemplated and are within the scope of the various teachings described.

Figure 1:
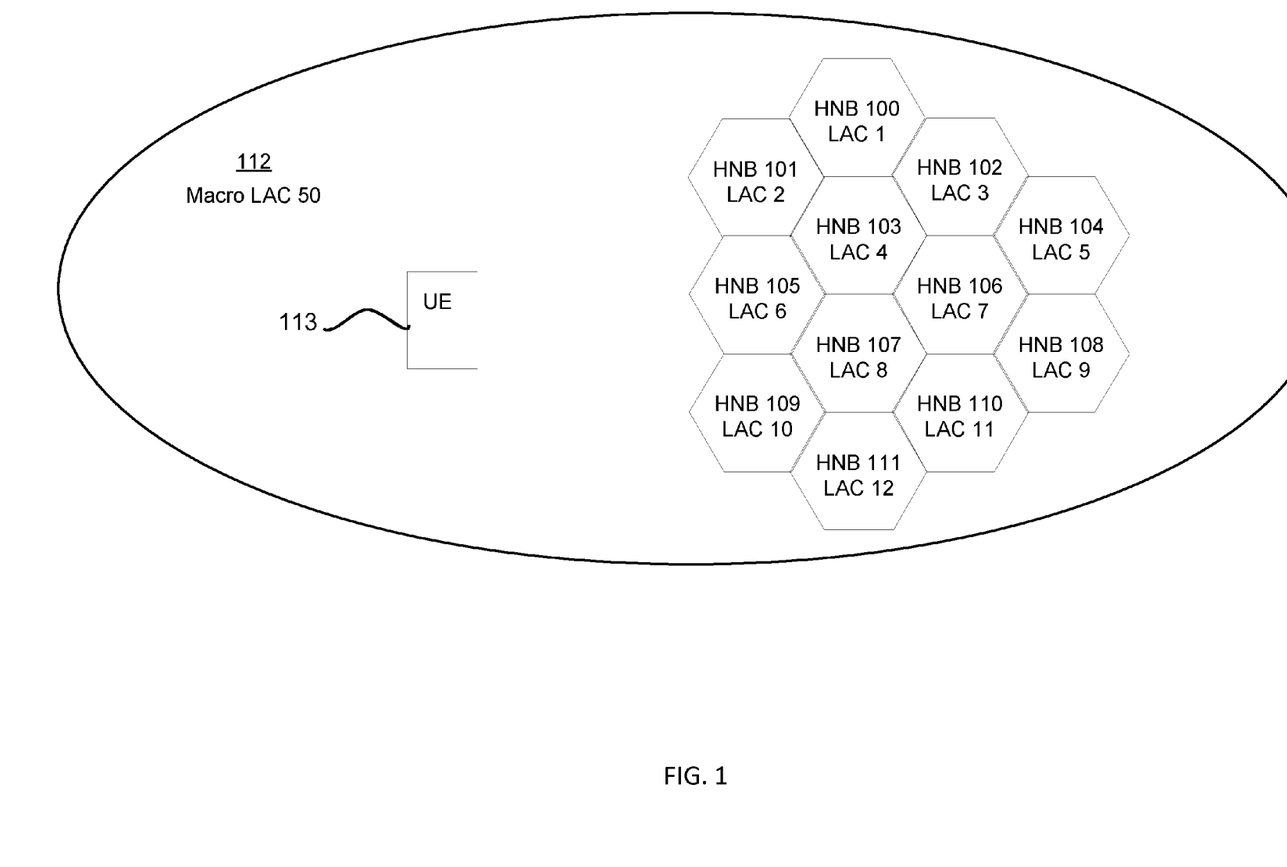
FIG. 1 illustrates an example of an arrangement of cells comprising a cellular communication system in accordance with an example embodiment.

Referring now to FIG. 1, a plurality of neighbouring small cells, each served by an Access Point which, in this example, comprise Home Node B's (HNB) 100-111 are clustered within a part of the coverage area of a macrocell 112. The small cells 100-111 and the macrocell 112 all serve to support communications between a User Equipment and a Core Network via a single Mobile Switching Centre. The small cells may cover a retail area such as a shopping mall. The area covered by the macrocell 112 is assigned a unique Location Area Code (LAC) 50. The HNB's 100-111 are assigned unique LACs 1 to 12 respectively. So each HNB has a LAC which is different from its neighbours and also different from the macrocell's LAC. A further (unique) LAC value is reserved for use as the Iu LAC. The Location Area Codes 1-12 are "on-the-air" (OTA) LAC's. Each small cell shares the same Iu LAC as all the other small cells in the small cell network 100-111 but has a different OTA LAC. A User Equipment 113 may move around the shopping mall in and out of the coverage areas of each HNB 100-111. A commercial enterprise (not shown) may be interested in knowing where the UE is within the shopping mall and the UE's identity (its IMSI for example) so that it may send advertising material to the UE which relates to a retail outlet which may be in its vicinity at the time. By receiving a location presence message indicating that a particular UE has requested registration with a particular small cell, and from knowledge of the geographical layout of the small cells, an estimate of the general location of the UE location may be made.

The OTA LAC's of the HNBs are arranged so that as the UE 113 moves from macrocell coverage to an area served by an HNB it sees a different LAC (eg. 1 instead of 50 if it comes within coverage of HNB 100). Hence, the UE will register to the HNB 100 by sending out a Location Update message including the old LAC 50. This Registration Request is passed to the Core Network, but the LACs in the messaging are changed so that the Core Network registers the UE to the Iu-LAC, but the UE considers itself registered to the OTA LAC 1 of the HNB 100.

Furthermore, as the UE 113 moves between the coverage areas of adjacent HNBs (eg. from HNB 100 to HNB 102), it will see a change of OTA LAC (from 1 to 3) and so it will register to the new HNB 102. This registration is handled locally and not relayed to the Core Network which still sees the LAC as the Iu LAC. Hence, there is the opportunity to generate Location Presence triggers without adding to Core Network load.

While the UE remains under the coverage area of HNB 100 it transmits periodic Location Updates. These are relayed to the Core Network with the LACs in the messaging changed to confirm the registration of the UE to the Iu-LAC. In an enhanced mode of operation, the HNB broadcasts a periodic location update timer value which is shorter than that required by the Core Network. This causes the UE to send out periodic Location Updates more frequently than expected by the Core Network. The majority of these (more frequent) periodic Location Updates are handled locally and not relayed to the Core Network, allowing the generation of location presence confirmation triggers without adding to Core Network load. Such messages are only passed to the Core Network at the interval expected by the Core Network. Further, if a periodic Location Update fails to arrive at the HNB 100 at the expected interval, this can be used to detect that a UE is no longer active in the HNB's area of coverage and to generate a location presence "exit" trigger.

Figure 2:
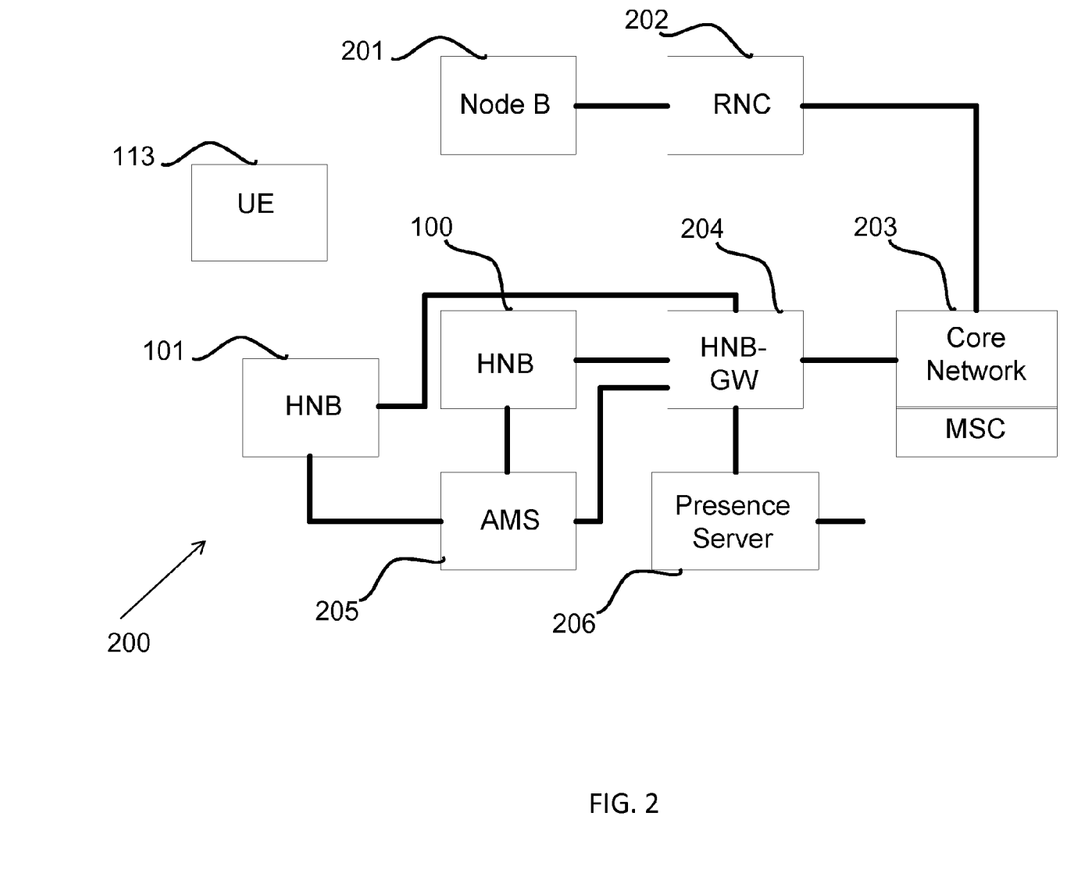
FIG. 2 illustrates a part of a cellular communication system operating in accordance with an example embodiment.

Referring now to FIG. 2, an example of part of a 3G wireless communication system operating in accordance with embodiments of the invention is illustrated and indicated generally at 200 and comprises a Node B 201 which supports wireless communications in macrocell 112. The Node B 201 is connected with a radio network controller (RNC) 202 which in turn is linked with a Core Network 203 which includes a Mobile Switching Centre and other conventional network elements (not shown)

The plurality of HNB's represented in FIG. 1 although only two 100, 101 are shown in FIG. 2 for the sake of clarity, are linked to the Mobile Switching Centre (MSC) through an Access Controller, which in this example is a Home Node B Gateway (HNB-GW) 204. An Access Point Management System (AMS) 205 is connected to the HNB-GW 204 and to each HNB. A presence server 206 is also connected with the HNB-GW 204. A User Equipment 113 may roam in and out of the coverage areas of the node B 201 or the HNB's 100, 101, 102-111 and request access to the core network through any one of these nodes. The HNB-GW 204 provides Presence Indications to the Presence Server 206 which offers a Presence API to presence-based applications which may be subscribed to by a commercial enterprise. The HNB-GW is aware of the OTA LAC values of all the HNB's under its control and is also aware of the Iu LAC. The HNB-GW is further configured to store the IMSI of a UE requesting registration and the LAC of the HNB' which receives the request.

The MSC of the Core Network 203 routes services for both the small cell and macrocell networks of FIG. 1. A UE 113, roaming between a coverage area of the macrocell 112 network and the coverage areas of the small cell network, will utilise the same MSC of the Core Network 103. The MSC is aware of the (Iu) LAC for the area covered by the small cell network and of the LAC 50 of the macrocell. Initially the Core Network 203 allocates a set of LAC's to the AMS 205. These are available for use as OTA LAC's and for at least one Iu LAC. The AMS 205 then decides which of the allocated LAC's to assign to each HNB 100-111. Each HNB 100-111 is informed of its OTA LAC and of the Iu LAC by the AMS 205. The HNB-GW is also aware of the Iu LAC and which OTA LAC's are assigned to which HNB's. If the number of HNB's in the small cell network exceeds the number of OTA LAC's in the set, then the AMS 205 may reuse OTA LAC's but ensures that this is done in such a fashion that LACs of adjacent small cells are different from one another.

In an alternative embodiment, the assignment of an OTA LAC is performed by the HNB itself on receiving the set of available OTA LAC's from the AMS 205.

The HNB-GW 204 is configured to generate a location presence notification message and send this to the presence server 206 each time it receives a registration request from a UE 113 via any one of the HNB's 100-111 to which it is linked.

In an alternative embodiment, the AMS 205 generates the location presence notification message and sends it to the presence server 206 on receiving a trigger from the HNB-GW 204 indicating that a UE 113 has requested registration via one of the HNB's 100-111.

In either case, the location presence notification message contains information relating to the identity of the UE 113 (eg. its IMSI) and the identity of the HNB which received the initial request for registration. The cell identity may be its OTA LAC or some other identifier derived from this. The presence server 205 may map an HNB identifier to a geographic location or to some identifier useful to presence applications.

In one example of operation, consider a UE 113 initially registered to the macro cell 112 and entering the coverage area of a first HNB 100. The UE detects the different OTA LAC 1 of the HNB 100 and establishes an RRC Connection to send a Location Update Request including the (old) LAC 50 of its last visited cell. As part of RRC (Radio Resource Control) Connection Establishment the HNB 100 obtains the IMSI of the UE. The HNB-GW 204 checks for any pairing of the IMSI with a LAC and determines that as the LAC 50 is not one of the known OTA LACs (1-12) this is considered as a new registration to the small cell network. The HNB-GW 204 replaces the OTA LAC 1 in the RANAP (Radio Access Network Application Part) parameters with the Iu LAC before forwarding the message to the Core Network. On receipt of the Location Update Accept from the Core Network, the HNB-GW replaces the Iu LAC in the NAS Location Update Accept with the OTA LAC 1 of the first HNB 100 and stores a pairing of the UE's IMSI and OTA LAC 1, along with other mandatory and optional parameters contained in the Location Update Accept.

If the UE 113 subsequently moves under the coverage of a second HNB 101, the UE detects the different OTA LAC 2 of the second HNB 101 and establishes an RRC Connection to send a Location Update Request. At the HNB-GW 204, the pairing of IMSI and the LAC in the NAS Location Update Request is checked. In this case the LAC 1 in the NAS request is one of the known OTA LACs 1-12 and the Location Update can be handled locally to the small cell network. The HNB-GW 204 constructs a Location Update Accept, including the new OTA LAC 2 of the second HNB 101 along with the other mandatory and optional parameters contained in the previous Location Update Accept for that IMSI from the Core Network. The HNB-GW sends the Location Update Accept to the UE via the second HNB and updates its stored pairing of IMSI and LAC to reflect the new LAC 2.

If the UE 113 stays under the coverage of HNB 101 for some time, the HNB-GW 204 may receive a periodic Location Update Request from the UE if the HNB 101 is broadcasting a periodic location update timer that is aligned with the Core Network's equivalent timer value. The HNB-GW 204 follows a similar process to initial registration on the small cell network, replacing the OTA LAC in the RANAP parameters with the Iu LAC before forwarding the message to the Core Network; and on receipt of the Location Update Accept from the Core Network, the HNB-GW replaces the Iu LAC in the Location Update Accept with the OTA LAC of the HNB 101 and updates the pairing of IMSI and OTA LAC, with the other mandatory and optional parameters contained in the Location Update Accept. The parameter replacement ensures that the UE remains attached to the Iu LAC from the Core Network point of view; and the storage of the additional parameters ensures that the HNB-GW has up to date information to service a Location Update Request corresponding to a UE moving between HNBs. If the HNB is broadcasting a periodic location update timer value that is a fraction of the Core Network's equivalent timer value then only the expected subset of periodic Location Update Requests are passed to the Core Network, with the additional requests handled locally.

Figure 3:
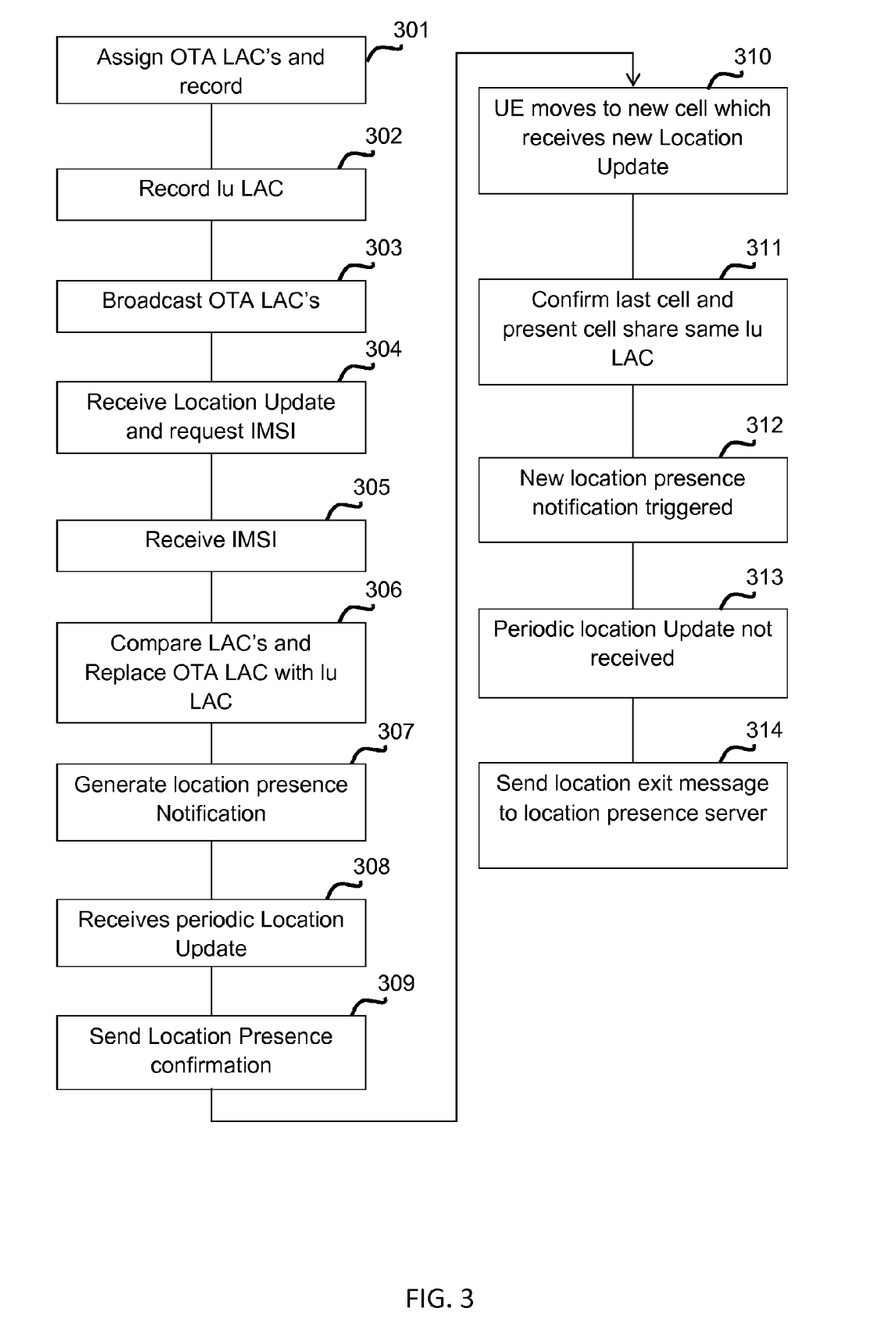
FIG. 3 is a flow chart of an example of a method for providing a location presence service.

An example of a method for operating a cellular communication system with location presence will now be described with reference to the simplified flow diagram of FIG. 3.

At 301 each HNB 100-111 in the small cell network is assigned a unique OTA LAC selected from a group of OTA LAC's and these values are recorded in the HNB-GW.

At 302 an Iu LAC is recorded in the HNB-Gateway 204 This Iu LAC is shared by all the small cells which lie within the small cell network.

At 303, each HNB 100-111 broadcasts its assigned OTA LAC which is received by any UE within its coverage area. On entering the coverage area of a particular HNB 100, a UE 113 will record the broadcast OTA LAC 1 and acknowledge that it is now operating within a new location area and initiate a Registration Request comprising a Location Update to the HNB 100.

At 304 the HNB 100 receives the Location Update and in response sends an Identity Request to the UE 113.

At 305 the HNB 100 receives the IMSI from the UE and sends the IMSI (with the Location Update) to the HNB-GW 204.

At 306 the HNB-GW 204 compares the old and new LAC's contained in the Location Update and replaces the OTA LAC 1 contained in the RANAP parameters with the Iu LAC and forwards a modified Location Update to the Core Network 203. On reply from the Core Network acknowledging the registration to the Iu LAC, the HNB.-GW 204 replaces the Iu LAC contained in the NAS registration response with the OTA LAC 1 and forwards the modified registration response to the UE via the HNB 100. The HNB-GW also stores a pairing of the UE's IMSI and the OTA LAC 1 for future reference. The HNB-GW also instructs the HNB 100 to broadcast a periodic Location Update timer value.

The UE 113 will internally update its current location area (which will be the OTA LAC) and subsequent communications and message exchanges will continue via the HNB 100 until the UE moves out of the coverage area of the HNB 100.

At 307 the HNB-GW 204 generates a location presence notification message and sends it to the presence server 206. This message contains the identity of the UE 113 and the identity of the cell in which it is currently located (that served by HNB 100 with OTA LAC 1).

At 308, the UE stays in the cell and sends Registration Requests comprising periodic Location Updates which are received by the HNB 100. The HNB-GW decides whether to relay the registration to the Core Network or handle locally, based on the relative values of the Core Network timer and the HNB timer.

At 309, the HNB-GW generates a location presence confirmation trigger message and sends it to the presence server 206.

At 310, the UE moves out of the coverage area of HNB 100 and into that of HNB 103. The UE sees a different LAC now and so sends a new Location Update which is received by HNB 103.

At 311 the HNB-GW 204 confirms that the last cell visited by the UE and its current cell both belong to the group of assigned OTA LAC's and so share the same Iu LAC. As the HNB-GW 204 is aware that the UE 113 has moved into one small cell from another small cell, which share the same Iu LAC, it does not forward the Location Update message to the Core Network but handles the registration locally instead, informing the UE that it is registered with a cell having LAC 4.

This new registration request will trigger, at 312, a further location presence notification message to the presence server 206.

In an alternate sequence, at 313 the expected periodic Location Update may not arrive. This could indicate for example that the UE has switched off without de-registering or returned to the macro cell. In this case the HNB-GW generates at, 314, a location exit message which is sent to the presence server 206. In an alternative embodiment, the substitution of the OTA LAC for the Iu LAC and vice versa is performed by the HNB.

While the invention has been described with respect to LACs, it will be apparent to one of ordinary skill in the art that some embodiments may perform a similar form of location presence service when the assigned area codes are Routing Area Codes rather than LAC's. This alternative of using Routing Area Codes is viable when a UE has an active data service and registers in the packet switched (PS) domain. In this case, registrations are exchanged with an SGSN (Serving GPRS (general packet radio system) Support Node) rather than an MSC. Also, in the case of combined registration for circuit switched and packet switched domains, the registrations are exchanged with the SGSN.

The functionality of the embodiments of the invention, particularly that of the HNB's 100-111, HNB-GW 204 and the AMS 205 may be achieved using computing systems or architectures known to those who are skilled in the relevant art. Computing systems such as, a desktop, laptop or notebook computer, hand-held computing device (PDA, cell phone, palmtop, etc.), mainframe, server, client, or any other type of special or general purpose computing device as may be desirable or appropriate for a given application or environment can be used. The computing system can include one or more processors which can be implemented using a general or special-purpose processing engine such as, for example, a microprocessor, microcontroller or other control module.

The computing system can also include a main memory, such as random access memory (RAM) or other dynamic memory, for storing information and instructions to be executed by a processor. Such a main memory also may be used for storing temporary variables or other intermediate information during execution of instructions to be executed by the processor. The computing system may likewise include a read only memory (ROM) or other static storage device for storing static information and instructions for a processor.

The computing system may also include an information storage system which may include, for example, a media drive and a removable storage interface. The media drive may include a drive or other mechanism to support fixed or removable storage media, such as a hard disk drive, a floppy disk drive, a magnetic tape drive, an optical disk drive, a compact disc (CD) or digital video drive (DVD) read or write drive (R or RW), or other removable or fixed media drive. Storage media may include, for example, a hard disk, floppy disk, magnetic tape, optical disk, CD or DVD, or other fixed or removable medium that is read by and written to by media drive. The storage media may include a computer-readable storage medium having particular computer software or data stored therein.

In alternative embodiments, an information storage system may include other similar components for allowing computer programs or other instructions or data to be loaded into the computing system. Such components may include, for example, a removable storage unit and an interface, such as a program cartridge and cartridge interface, a removable memory (for example, a flash memory or other removable memory module) and memory slot, and other removable storage units and interfaces that allow software and data to be transferred from the removable storage unit to computing system.

The computing system can also include a communications interface. Such a communications interface can be used to allow software and data to be transferred between a computing system and external devices. Examples of communications interfaces can include a modem, a network interface (such as an Ethernet or other NIC card), a communications port (such as for example, a universal serial bus (USB) port), a PCMCIA slot and card, etc. Software and data transferred via a communications interface are in the form of signals which can be electronic, electromagnetic, and optical or other signals capable of being received by a communications interface medium.

In this document, the terms 'computer program product', 'computer-readable medium' 'non-transitory computer-readable medium' and the like may be used generally to refer to tangible media such as, for example, a memory, storage device, or storage unit. These and other forms of computer-readable media may store one or more instructions for use by the processor comprising the computer system to cause the processor to perform specified operations. Such instructions, generally referred to as 'computer program code' (which may be grouped in the form of computer programs or other groupings), when executed, enable the computing system to perform functions of embodiments of the present invention. Note that the code may directly cause a processor to perform specified operations, be compiled to do so, and/or be combined with other software, hardware, and/or firmware elements (e.g., libraries for performing standard functions) to do so.

In an embodiment where the elements are implemented using software, the software may be stored in a computer-readable medium and loaded into computing system using, for example, removable storage drive. A control module (in this example, software instructions or executable computer program code), when executed by the processor in the computer system, causes a processor to perform the functions of the invention as described herein.

Furthermore, the inventive concept can be applied to any circuit for performing signal processing functionality within a network element. It is further envisaged that, for example, a semiconductor manufacturer may employ the inventive concept in a design of a stand-alone device, such as a microcontroller of a digital signal processor (DSP), or application-specific integrated circuit (ASIC) and/or any other sub-system element.

It will be appreciated that, for clarity purposes, the above description has described embodiments of the invention with reference to a single processing logic. However, the inventive concept may equally be implemented by way of a plurality of different functional units and processors to provide the signal processing functionality. Thus, references to specific functional units are only to be seen as references to suitable means for providing the described functionality, rather than indicative of a strict logical or physical structure or organisation.

Aspects of the invention may be implemented in any suitable form including hardware, software, firmware or any combination of these. The invention may optionally be implemented, at least partly, as computer software running on one or more data processors and/or digital signal processors or configurable module components such as FPGA devices. Thus, the elements and components of an embodiment of the invention may be physically, functionally and logically implemented in any suitable way. Indeed, the functionality may be implemented in a single unit, in a plurality of units or as part of other functional units.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible and/or advantageous. Also, the inclusion of a feature in one category of claims does not imply a limitation to this category, but rather indicates that the feature is equally applicable to other claim categories, as appropriate.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

I claim:

1. A method operating a cellular communication system comprising a plurality of neighbouring small cells, each of said plurality of neighbouring small cells supporting communications between a wireless communication unit and a core network through an access controller, the method comprising:

assigning a unique area code from a group of unique area codes to each neighbouring small cell, storing a unique area code associated with the access controller;

receiving at a first of said neighbouring small cells, a registration request from a wireless communication unit, said request including an identity of the wireless communication unit and an area code of a last visited cell;

comparing the area code of the last visited cell with the area code of the first cell, and if they are different and belong to said group of unique area codes, generating an acceptance message including the unique area code of the first cell and forwarding said acceptance message to the wireless communication unit without forwarding the registration request to the core network otherwise;

replacing the unique area code of the first cell with the area code associated with the access controller in the registration request and forwarding the request to the core network; and replacing the unique area code associated with the access controller with the unique area code of the first cell in a registration acceptance message received from the core network and forwarding the registration acceptance message to the wireless communication unit.

2. The method of claim 1, further comprising:

accepting the registration request of the wireless communication unit in the first cell;

sending an instruction to the wireless communication unit to transmit a location update message every T minutes;

monitoring said location update messages in the first cell; and notifying the location presence server of the exit of the wireless communication unit from the first cell when a location update message has not been received in the first cell for a period exceeding T minutes.

3. The method of claim 2, wherein the period T is set to be shorter than an equivalent period, Z, set by the Core Network and wherein location update messages received by the first cell are forwarded to the Core Network with a periodicity not less than Z.

4. The method of claim 1, including, on receipt of the registration request, notifying a location presence server of the presence of the wireless communication unit in said first cell and of the identity of the wireless communication unit.

5. The method of claim 1, wherein the method further comprises storing the identity of the wireless communication unit and the unique area code of the first cell as a linked pair of parameters if the area code of the last visited cell and the area code of the first cell are different.

6. The method of claim 1, wherein the unique area code assigned to the plurality of neighbouring small cells is a Location Area Code.

7. The method of claim 1, wherein the unique area code assigned to the plurality of neighbouring small cells is a Routing Area Code.

8. A non-transitory computer readable medium having an executable computer program code stored thereon for execution by a processor to perform a method in accordance with claim 1.

9. The non-transitory computer readable medium of claim 8 comprising at least one from a group consisting of: a hard disk, a CD-ROM, an optical storage device, a magnetic storage device, a Read Only Memory, a Programmable Read Only Memory, an Erasable Programmable Read Only Memory, an Electrically Erasable Programmable Read Only Memory and a Flash memory.

10. An apparatus for a cellular communication system, the system comprising a plurality of neighbouring small cells, each of said plurality of neighbouring small cells supporting communications between a wireless communication unit and a core network through an access controller, the apparatus comprising one or more network elements for:

assigning a unique area code from a group of unique area codes to each neighbouring small cell;

storing a unique area code associated with the access controller;

receiving at a first of said neighbouring small cells, a registration request from a wireless communication unit, said request including an identity of the wireless communication unit and an area code of the last visited cell;

comparing the area code of the last visited cell with the unique area code of the first cell, and if they are different and belong to said group of unique area codes, generating an acceptance message including the unique area code of the first cell and forwarding said acceptance message to the wireless communication unit without forwarding the registration request to the core network otherwise;

replacing the unique area code of the first cell with the area code associated with the access controller in the registration request and forwarding the registration request to the core network; and replacing the unique area code associated with the access controller with the unique area code of the first cell in a registration acceptance message received from the core network and forwarding the registration acceptance message to the wireless communication unit.

11. The apparatus of claim 10, comprising one or more network elements for:

sending an instruction to the wireless communication unit to transmit a location update message every T minutes;

monitoring said location update messages in the first cell; and notifying the location presence server of the exit of the wireless communication unit from the first cell when a location update message has not been received in the first cell for a period exceeding T minutes.

12. The apparatus of claim 10, including one or more network elements for, on receipt of the request, generating a location presence message including data relating to the location of the first cell and the identity of the wireless communication unit, and further including a location presence server for receiving said location presence message and for storing said data.

13. The apparatus of claim 10, comprising one or more network elements for storing the identity of the wireless communication unit and the unique area code of the first cell as a linked pair of parameters if the area code of the last visited cell and the area code of the first cell are different.

* * * * *